(12) United States Patent
Autran et al.

(10) Patent No.: US 7,960,478 B2
(45) Date of Patent: Jun. 14, 2011

(54) FIBERS AND NONWOVENS COMPRISING POLYPROPYLENE BLENDS AND MIXTURES

(75) Inventors: Jean-Philippe Marie Autran, Wyoming, OH (US); Kelyn Anne Arora, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/842,107

(22) Filed: Jul. 23, 2010

(65) Prior Publication Data

US 2010/0286339 A1    Nov. 11, 2010

Related U.S. Application Data

(60) Division of application No. 12/349,757, filed on Jan. 7, 2009, now Pat. No. 7,781,527, which is a continuation of application No. 11/042,237, filed on Jan. 25, 2005, now Pat. No. 7,491,770.

(60) Provisional application No. 60/539,298, filed on Jan. 26, 2004.

(51) Int. Cl.
*C08L 23/04* (2006.01)
*C08L 23/10* (2006.01)

(52) U.S. Cl. .................... 525/191; 525/240

(58) Field of Classification Search ............ 525/191, 525/240
See application file for complete search history.

(56) References Cited

U.S. PATENT DOCUMENTS

| | | | |
|---|---|---|---|
| 3,855,046 A | 12/1974 | Hansen et al. |
| 4,021,284 A | 5/1977 | Kalwaites |
| 4,024,612 A | 5/1977 | Contractor et al. |
| 4,116,892 A | 9/1978 | Schwarz |
| 4,834,741 A | 5/1989 | Sabee |
| 5,143,679 A | 9/1992 | Weber et al. |
| 5,156,793 A | 10/1992 | Buell et al. |
| 5,167,897 A | 12/1992 | Weber et al. |
| 5,422,172 A | 6/1995 | Wu |
| 5,518,801 A | 5/1996 | Chappell et al. |
| 5,616,412 A | 4/1997 | Lin |
| 5,804,284 A | 9/1998 | Lennon et al. |
| 5,932,497 A | 8/1999 | Morman et al. |
| 5,986,008 A | 11/1999 | Matsunaga et al. |
| 6,013,151 A | 1/2000 | Wu et al. |
| 6,080,818 A | 6/2000 | Thakker et al. |
| 6,199,437 B1 | 3/2001 | Kumaraswamy et al. |
| 6,235,664 B1 | 5/2001 | Georgellis et al. |
| 6,417,122 B1 | 7/2002 | Newkirk et al. |
| 6,476,135 B1 | 11/2002 | Bugada et al. |
| 6,506,698 B1 | 1/2003 | Quantrille et al. |
| 6,555,643 B1 | 4/2003 | Rieger |
| 6,646,051 B1 | 11/2003 | Demain |
| 6,710,134 B2 | 3/2004 | Demain |
| 6,720,045 B2 | 4/2004 | Kawamura et al. |
| 6,720,388 B1 | 4/2004 | Demain |
| 6,723,669 B1 | 4/2004 | Clark et al. |
| 6,770,356 B2 | 8/2004 | O'Donnell et al. |
| 6,770,713 B2 | 8/2004 | Hanke et al. |
| 6,896,843 B2 | 5/2005 | Topolkaraev et al. |
| 7,223,818 B2 | 5/2007 | Autran et al. |
| 7,491,770 B2 | 2/2009 | Autran et al. |
| 7,781,527 B2 | 8/2010 | Autran et al. |
| 2002/0119720 A1 | 8/2002 | Arora et al. |
| 2004/0038612 A1 | 2/2004 | Forbes et al. |
| 2004/0161992 A1 | 8/2004 | Clark et al. |
| 2004/0197588 A1 | 10/2004 | Thomas et al. |
| 2005/0037194 A1 | 2/2005 | Greene et al. |
| 2005/0170727 A1 | 8/2005 | Melik et al. |

FOREIGN PATENT DOCUMENTS

| | | |
|---|---|---|
| EP | 0 889 089 B2 | 6/1999 |
| EP | 1 106 644 B1 | 6/2001 |
| EP | 1 443 132 A2 | 8/2004 |
| EP | 1 566 475 A1 | 8/2005 |
| WO | WO 00/28122 | 5/2000 |
| WO | WO 01/30563 | 5/2001 |
| WO | WO 01/64979 A1 | 9/2001 |
| WO | WO 01/73174 A1 | 10/2001 |
| WO | WO 03/057468 A1 | 7/2003 |
| WO | WO 2004/005601 A1 | 1/2004 |
| WO | WO 2004/041538 A1 | 5/2004 |
| WO | WO 2004/060982 A1 | 7/2004 |
| WO | WO 2004/061173 A2 | 7/2004 |
| WO | WO 2004/061181 A1 | 7/2004 |
| WO | WO 2004/067818 A2 | 8/2004 |

OTHER PUBLICATIONS

Andy Campbell;The Effect of Polymer Molecular Weight on Meltblown Fabrics; Nonwovens World, Apr.-May 2005, pp. 74-79.
Guruswamy Kumaraswamy, Julia A. Kornfield, Fengji Yeh & Benjamin S. Hsiao; Shear-Enhanced Crystallization in Isotactic Polypropylene. 3. Evidence for a Kinetic Pathway to Nucleation; Macromolecules 2002, 35, pp. 1762-1769.
Guruswamy Kumaraswamy, Ravi K. Verma & Julia A. Kornfield; Novel flow apparatus for investigating shear-enhanced crystallization and structure development in semicrystalline polymers; Review of Scientific Instruments, vol. 70, No. 4, Apr. 1999, pp. 2097-2104.
Motohiro Seki, Derek W. Thurman, James P. Oberhauser, & Julia Kornfield; Shear-Mediated Crystallization of Isotactic Polympropylene: The Role of Long Chain—Long Chain Overlap; Macromolecules 2002, 35, pp. 2583-2594.

*Primary Examiner* — Nathan M Nutter
(74) *Attorney, Agent, or Firm* — Andrew A Paul (57) ABSTRACT

Polypropylene materials comprising a polymeric blend, the polymeric blend comprising: (a) a first linear low density metallocene polyethylene; and (b) a second linear low density polyethylene; wherein the polypropylene material has a first turbidity half time measured under quiescent conditions, and a second turbidity half time measured at a wall shear stress of about 0.11 MPa, and having a certain ratio of the second turbidity half time to the first turbidity half time.

11 Claims, 2 Drawing Sheets

FIBERS AND NONWOVENS COMPRISING POLYPROPYLENE BLENDS AND MIXTURES

CROSS REFERENCE TO RELATED APPLICATIONS

This application is a divisional of U.S. application Ser. No. 12/349,757, filed Jan. 7, 2009 now U.S. Pat. No. 7,781,527 which is a continuation of U.S. application Ser. No. 11/042,237, filed Jan. 25, 2005 now U.S. Pat. No. 7,491,770, which claims the benefit of U.S. Provisional Application No. 60/539,298, filed Jan. 26, 2004, the substances of which are incorporated herein by reference.

FIELD OF INVENTION

Polymeric blends and polymeric mixtures comprising a mixture of a first polypropylene and a second polypropylene are provided. Also provided are fibers and nonwoven materials comprising fibers which comprise the polymeric blends, and/or the polymeric mixtures.

BACKGROUND OF THE INVENTION

Polyolefin resins, such as polypropylene, for use in nonwovens are difficult to produce and pose additional challenges compared to polyolefin resins suitable for films. This is because the material and processing requirements for production of fibers are much more stringent than for producing films. For the production of fibers, the residence time available for structure formation is typically much shorter and flow characteristics are more demanding on the material's physical and rheological properties. Also, the local strain rate and shear/extensional rate are much greater in fiber production than other processes and, for spinning very fine fibers, small defects, slight inconsistencies, or phase incompatibilities in the melt are not acceptable for a commercially viable process.

Generally, smaller fiber diameters will enable softer nonwovens. Softer nonwovens are desirable as they are gentler to the skin, feel right to the touch and help provide a more garment-like aesthetic for diapers, wipes and other like products.

Another desirable attribute sought in the fibers comprising nonwovens, besides softness, is abrasion resistance. Abrasion resistance is also important since it ensures that both the fibers and the nonwovens possess sufficient mechanical integrity during use so as to not fall apart and produce undesirable fuzz or lose aesthetics.

Nonwovens that are capable of high extensibility at relatively low force are also desired. These can be used to provide sustained fit in products, such as diapers and the like, and facilitate the use of various mechanical post-treatments. Typically, it has been found that having both a smaller fiber diameter and an easy to extend fiber are difficult to achieve. This is because, when the fiber diameter is reduced, it is commonly done by increasing the spinning speed or draw ratio during spinning which decreases extensibility of the fiber in post mechanical treatment due to increased polymer orientation.

More recently, there has also been a growing need in the industry for nonwovens that can also exhibit significant extensibility or cold-drawability when used in disposable products. Indeed, for absorbent articles such as diapers and catamenials, solid-state activation processes have become an integral part of the fabrication of many chassis components. Such processes can provide important functional benefits: improved softness or hand that increase a nonwoven's comfort and feel; added loft, texture or aperturing that enhance visual appearance, alter transport properties or desirably modify mechanical properties. In such processes, however, the nonwoven needs to remain intact after being stretched at a high strain rate.

One way the art has used to address these issues is to blend various polymeric resins. For example, U.S. Pat. No. 6,476,135 describes blends of as-polymerized, high melt flow rate (MFR) propylene homopolymer (250 to 550 g/10 min) and a random copolymer of propylene and ethylene and/or a $C_4$-$C_{10}$ α-olefin which are suitable for production of extensible fibers. Nonwoven fabrics that are formed with fibers prepared using propylene impact copolymer compositions are disclosed in published PCT applications WO 01/64979 A1 and WO 01/64979 A1. U.S. Pat. No. 5,804,286 describes a fiber, nonwoven and multilayered fabric comprising various polymers such as isotactic polypropylene, polyethylene and a block or grafted polyolefin copolymer or terpolymer which is at least partially miscible with the polypropylene and the polyethylene. Multilayered structures are also claimed in U.S. Pat. No. 6,506,698 and WO 00/28122 U.S. Pat. No. 5,616,412 discloses fine denier filaments having a high elongation at break that comprise a blend of polypropylene and polystyrene where the blends are made by forming an intimate blend using a twin screw extruder and then spinning the blend. Published PCT application WO 01/73174 A1 describes a method of making a fabric comprising a plurality of fibers, the fibers comprising a least one polypropylene polymer and at least one ethylene polymer.

Another way the art addressed these issues is through bicomponent fibers. For example, published PCT application WO 01/30563 describes an elastic laminate employing a nonwoven layer that includes bicomponent fibers having a sheath-core structure. The sheath contains an ethylene-propylene random copolymer that contains about 7 mol % to about 15 mol % of ethylene comonomer randomly distributed in the polymer backbone. U.S. Pat. No. 6,417,122 discloses multicomponent fibers comprising at least two polymer components arranged in structured domains, where each component comprises a multi-polymer blend of at least two different polyolefins with the higher melting phase being either the dominant continuous phase or the non-continuous phase.

The use of random copolymers or stereoisomers of polypropylene in fibers has also been described. For example a spunbonded fabric that consists of fibers with a diameter of from about 5 to about 40 microns, that are made of polypropylene copolymer blends with high ethylene content (>10 wt %) for at least one of the components is disclosed in U.S. Pat. No. 6,235,664. U.S. Pat. No. 6,080,818 discloses a fiber, thread or yarn that includes a polymer blend of a predominantly atactic flexible polyolefin with an isotactic polypropylene, a method for preparing such a fiber, thread or yarn and nonwovens products prepared therefrom.

As noted above, there exists an unmet need for highly extensible nonwovens with fibers that can be made from commercially available thermoplastic resins without the need for high cost specialty polymers or complex manufacturing processes. It is well known that, as spinning speeds increase, molecular orientation increases, stress to further deform the fiber increases and fiber elongation decreases. This is ideal for producing low denier fibers with high strength and low deformability. However, producing fine fibers with high extensibility at an affordable cost remains a very significant challenge.

There is also a need for a polypropylene material suitable for use in a fibrous nonwoven which is readily extensible (especially at high strain rates) and has improved abrasion resistance.

SUMMARY OF THE INVENTION

A first aspect of the present invention provides a polymeric blend comprising at least:
(a) a first polypropylene with an average melt temperature $T_{M1}$ and a melt flow rate $MFR_1$; and
(b) a second polypropylene with an average melt temperature $T_{M2}$ and a melt flow rate $MFR_2$;
where the polymeric blend has an average melt temperature $T_{Mb}$ between about 125° C. and about 160° C. and a melt flow rate $MFR_{pa}$, between about 10 g/10 minutes and about 40 g/10 minutes, wherein:
$T_{M1} < T_{Mb} < T_{M2}$, and
$MFR_1 < MFR_b < MFR_2$.
Preferably, there is also a minimum difference of about 10° C. between $T_{M1}$ and $T_{M2}$ and a minimum ratio $MFR_2:MFR_1$ of at least about 2.0:1.0.

In a preferred embodiment of the present invention, the first polypropylene is a metallocene resin with an average melt temperature $T_{M1}$, between about 110° C. and about 135° C. and a melt flow rate $MFR_1$ between about 5 to about 25 and the second polypropylene has an average melt temperature $T_{M2}$ between about 135° C. and about 165° C. and a melt flow rate $MFR_2$, between about 25 g/10 minutes and about 50 g/10 minutes.

In alternative embodiments of the present invention the polymeric blend can comprise one or more additional polypropylenes and the polymeric blend can be blended with an adjunct.

In additional embodiments of the present invention the polymeric blend or the blend/adjunct blend can be extruded into fibers that are suitable for use in nonwoven materials. The fibers can either comprise the aforementioned polymeric compositions or be in a bicomponent form further comprising an additional resin.

All documents cited are, in relevant part, incorporated herein by reference; the citation of any document is not to be construed as an admission that it is prior art with respect to the present invention. All percentages, ratios and proportions are by weight, and all temperatures are in degrees Celsius (° C.), unless otherwise specified. All measurements are in SI units unless otherwise specified.

DETAILED DESCRIPTION OF THE INVENTION

Definitions

As used herein, the term "polymeric blend" means a mixture of polymers which includes, but is not limited to, homopolymers, copolymers (e.g., block, graft, random and alternating copolymers), terpolymers, etc., and blends and modifications thereof which are in the form of a solid solution, that is a homogeneous mixture. Optional adjuncts may be added to the polymeric blend and, if the blend remains a solid solution, such blends are also considered polymeric blends.

As used herein, the term "polymeric mixture" means a mixture of a polymeric blend and an adjunct, described herein, in which one or more of the components of the adjunct are immiscible in the polymeric blend, i.e., the mixture is heterogeneous. For example, the adjunct is insoluble in one or both of first and second polypropylenes.

As used herein, the term "random copolymers" or "RCP" refers to polypropylene-based copolymers that incorporate either ethylene or alpha-olefins higher than propylene (butene, hexene . . . ) as comonomers that are introduced into the chain in a statistical or random manner. The result is a decrease in the overall crystallinity of the material owing to the lower self-similarity of the polymer chain that negatively affects its ability to crystallize. When no comonomer is incorporated into the chain, the polypropylene homopolymer is obtained.

As used herein, the term "spunbonded fibers" refers to small diameter substantially continuous fibers that are formed by extruding a molten thermoplastic material as filaments from a plurality of fine, usually circular, capillaries of a spinneret with the diameter of the extruded filaments then being rapidly reduced by drawing using conventional godet winding systems or through air drag attenuation devices. If a godet system is used, the fiber diameter can be further reduced through post extrusion drawing.

As used herein, the term "extensible" refers to any fiber, which, upon application of a biasing force, is elongatable to at least about 200 percent without experiencing catastrophic failure, preferably to at least 400 percent elongation without experiencing catastrophic failure, more preferably to at least 600 percent elongation without experiencing catastrophic failure and most preferably to at least 800 percent elongation without experiencing catastrophic failure. The percent elongation to break can be determined as described in the TEST METHODS section below and is defined as the expanded length at break minus the initial test gauge length divided by the initial test gauge length multiplied by 100.

As used herein, the "equivalent diameter" of a noncircular cross section fiber is the diameter of a circle having the same cross-sectional area as the fiber.

As used herein, the term "nonwoven web", or "nonwoven material" refers to a web that has a structure of individual fibers or threads which are interlaid, but not in any regular, repeating manner. Nonwoven webs have been, in the past, formed by a variety of processes, including, but not limited to, air laying processes, meltblowing processes, spunbonding processes and carding processes.

As used herein, the terms "consolidation" and "consolidated" refer to the bringing together of at least a portion of the fibers of a nonwoven web into closer proximity to form a site, or sites, which function to increase the resistance of the nonwoven to external forces, e.g., abrasion and tensile forces, as compared to the unconsolidated web. "Consolidated" can refer to an entire nonwoven web that has been processed such that at least a portion of the fibers are brought into closer proximity, such as by thermal point bonding. Such a web can be considered a "consolidated web". In another sense, a specific, discrete region of fibers that is brought into close proximity, such as an individual thermal bond site, can be described as "consolidated".

As used herein, the term "absorbent article" refers to devices that absorb and contain body exudates, and, more specifically, refers to devices that are placed against or in proximity to the body of the wearer to absorb and contain the various exudates discharged from the body.

The term "disposable" is used herein to describe absorbent articles that are not intended to be laundered or otherwise restored or reused as an absorbent article (i.e., they are intended to be discarded after a single use and, preferably, to be recycled, composted or otherwise disposed of in an environmentally compatible manner).

Polymeric Blend

The polymeric blends of the present invention include at least a first polypropylene and a second polypropylene. Without being bound by theory, it is believed that the polymeric blends of the present invention combine the best features of the component polypropylenes. In particular, it is believed that: 1) the low melt temperature, low melt flow rate component provides strength to fibers comprising the polymeric blends (e.g., tensile strength at break) with resulting abrasion resistance and improved stability in a consolidated nonwoven web by providing a high molecular weight "backbone" to the blend and 2) the high melt temperature, high melt flow rate component provides improved extrusion line throughput, fiber drawdown and cold extensibility compared to prior art fibers having a comparable tensile strength at break by interfering with flow induced crystallization caused by stretching the low melt flow rate component of the blend. The art has failed to recognize that, by defining the constituent resins in a blend for both melt temperature and melt flow rate and how these properties relate, such a desirable combination of properties can be achieved. It has been found that the multi-dimensional (melt temperature and melt flow rate) assessment of resins described herein provides improved blends that have meaningful improvements in these properties.

Particularly preferred blends comprise blends of a metallocene catalyzed propylene homopolymer and a metallocene catalyzed random copolymer. As will be described in greater detail below such blends provide both improved processing and improved tensile properties. It should be recognized that all blends comprising blends of polymers meeting the melt temperature and melt flow rate criteria described herein are within the scope of the present invention. For example, as can be seen in the Examples, a blend of a polypropylene homopolymer with a metallocene catalyzed RCP provides substantial processing benefits (e.g., lower melt temperature) while providing mechanical properties at least as good as those of fibers spun from single component polypropylene resins.

Without being bound by theory, it is believed that the narrower molecular weight distributions of metallocene catalyzed polymers results in a reduction in flow induced crystallization in a polymer blend. Said another way, there will be a broader range of molecular weight and composition in a resin where the resin was produced using non metallocene (e.g., Ziegler-Natta) technology than if metallocene technology was used. The high molecular weight fraction may become a source of premature flow induced crystallization during extrusion if the melt flow rate of some fraction of the resin is low enough that it changes the relationship between the first and second (polypropylenes) for a portion of the blend. That is, instead of an blend comprising a first polypropylene having a lower melt temperature and a lower melt flow rate than the second polypropylene, a portion of the blend comprises a combination that has a first polypropylene with a lower melt temperature and, possibly, a melt flow rate not very different than the melt flow rate of a second polypropylene. This "reversal" of the relationship between the first and second polypropylenes is believed to facilitate flow induced crystallization because the low melt flow rate portion of the wide molecular weight distribution resin can associate with semi-crystalline superstructures believed to be formed as polymer molecules are stretched during extrusion (see Kornfield, J. Proceedings Short course: Flow/Process Induced Crystallization of Polymers, Materials Engineering and Sciences Division, American Institute of Chemical Engineers, 2002 Annual Meeting, Indianapolis, Nov. 3, 2002).

Figure 2:
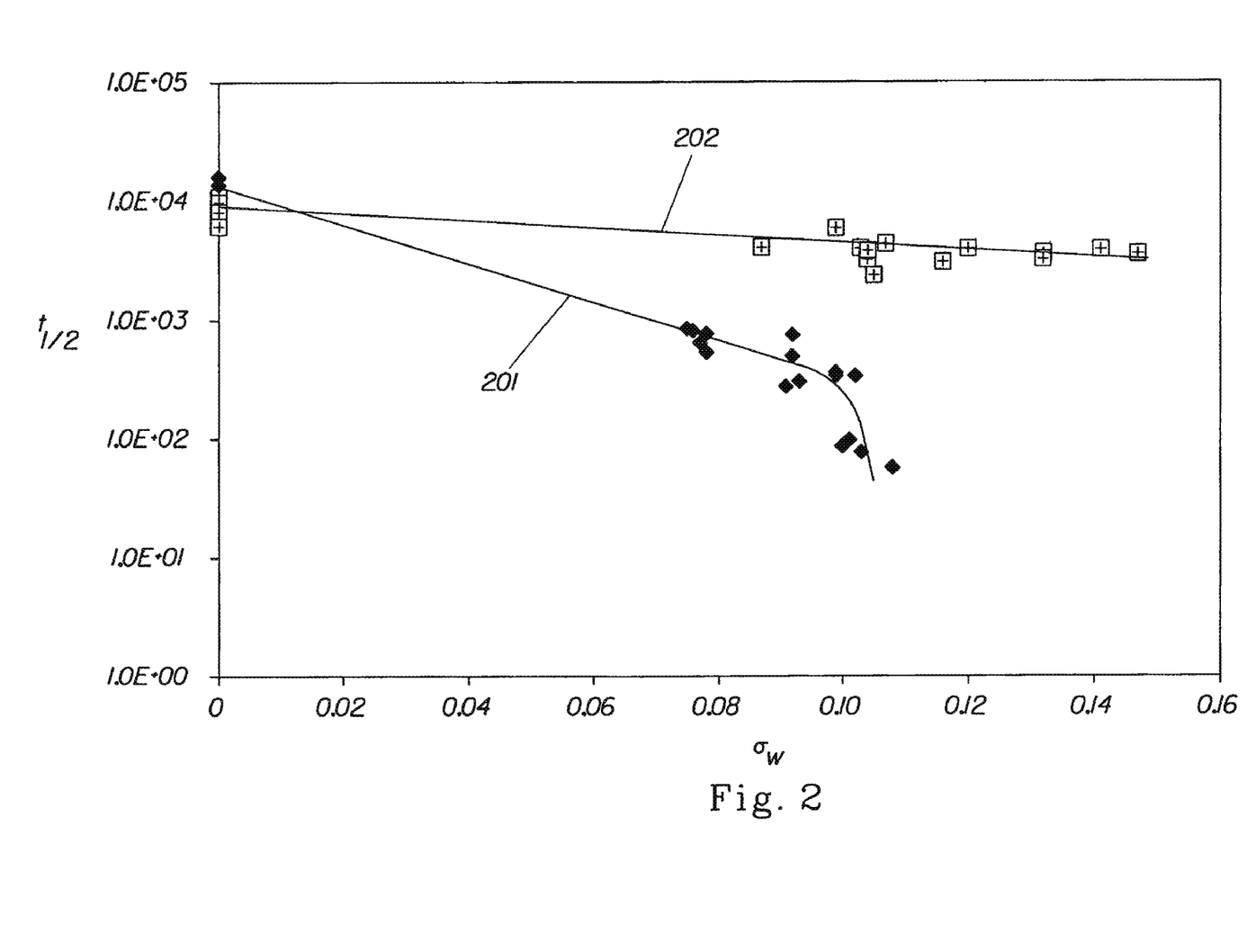
FIG. 2 is a graph relating the time for a 50% increase in turbidity and wall shear stress measured according to the Rheo-Optical Characterization method described herein.

As is shown in Example 4 and FIG. 2, flow induced crystallization results in a "critical" wall shear stress ($\sigma_w$) at which crystal formation rapidly increases. As will be recognized, such crystal formation (either as a result of shear at a wall or extensional orientation during a draw process) will substantially affect the properties of products that are processed at shear stresses greater than that which causes the onset of flow induced crystallization. As a result, the compositions according to the present invention, which as can be clearly seen in FIG. 2, are much less sensitive to flow induced crystallization and have the improved properties discussed above. Suitably, a blend according to the present invention has a turbidity half time value ($t_{1/2}$) that is greater than about 1000 seconds at a $\sigma_w$ of 0.11 MPa when measured according to the Rheo-Optical method described in the Test Methods section below. Preferably, $t_{1/2}$ is greater than about 2000 seconds, more preferably greater than 3000 seconds. Said another way, the resin blends of the present invention maintain a desirably low level of crystallization at elevated wall shear stress. One way of looking at such a low level of crystallization is a ratio of turbidity half time at a predetermined, elevated wall shear stress ($t^{\sigma w}_{1/2}$) to the turbidity half time under quiescent conditions ($t^0_{1/2}$). A suitable measure of the elevated shear stress condition is $t_{1/2}$ at a $\sigma_w$ of 0.11 MPa ($t^{0.11}_{1/2}$). Suitably, the ratio of $t^{0.11}_{1/2}:t^0_{1/2}$ is greater than about 0.33, preferably greater than about 0.5, more preferably greater than about 0.75, still more preferably greater than about 0.9.

The polymeric blends of the present invention have an average melt temperature $T_{Mb}$ of from about 125° C. to about 160° C., preferably from about 130° C. to about 160° C., more preferably from about 130° C. to about 155° C. The melt temperature of the polymeric blend, $T_{Mb}$ is greater than the melt temperature of the first polypropylene $T_{M1}$ while also being less than the melt temperature of the second polypropylene $T_{M2}$. Preferably there is also a minimum difference of about 10° C. between $T_{M1}$ and $T_{M2}$, more preferably the difference is at least about 15° C. It is believed that this melt temperature difference helps insure that flow induced crystallization is minimized. A method for measuring average melt temperature is provided in the TEST METHODS section below.

Furthermore, the polymeric blend of the present invention has a melt flow rate $MFR_b$. Typically the melt flow rate of the polymeric blend $MFR_b$ is between about 10 g/10 minutes to about 40 g/10 minutes, preferably from about 15 g/10 minutes to about 35 g/10 minutes, more preferably from about 20 g/10 minutes to about 30 g/10 minutes. The $MFR_b$ of the polymeric blend, is greater than the $MFR_1$ of the first polypropylene while also being less than the $MFR_2$ of the second polypropylene. A melt flow rate ratio ($MFR_2:MFR_1$) of at least about 2.0:1.0 is also particularly preferred, more preferably at least about 2.5:1.0. Without being bound by theory, it is believed that such a ratio helps insure that only the minimum required quantity of low melt flow rate resin necessary to provide desired mechanical properties is a component of the blend. A method for measuring melt flow rate is provided in the TEST METHODS section below. Alternatively, if there is not enough sample for melt flow rate determinations or if it is necessary to determine melt flow rate of fractions of a blend, an alternative molecular weight measure, such as gel permeation chromatography, can be used and known correlations between molecular weight and melt flow rate can be used to determine the melt flow rate for the blend.

One skilled in the art will appreciate that the melt flow rate of the polymeric blends described herein is suitable for the fiber producing method of interest, for example, extrusion for staple fibers or spun bonding.

In one optional embodiment of the present invention the weight ratio of the first polypropylene and the second polypropylene is from about 1:4 to about 4:1.

In another optional embodiment of the present invention the polymeric blend comprises from about 25% to about 75% by weight of polymeric blend of the first polypropylene, and from about 25% to about 75% by weight of polymeric blend of the second polypropylene.

The polymeric blends of the present invention may be prepared in any suitable fashion, including, but not limited to, blending the desired components in the desired proportions using conventional blending, techniques and apparatus, including a Banbury mixer (available from Farrel Corp., Ansonia, Conn.) or laboratory extruders, such as the Polylab Twin Screw Extruder (available from Thermo Electron (Karlsruhe), Karlsruhe, Germany) which are suitable for preparing small batches of material. Commercial scale pelletizing extruders may also be used for preparing larger blend quantities, and the like. It is even possible to prepare a premixture of pellets comprising pellets of the first polypropylene and pellets of the second polypropylene relying on intimately mixing the pellet premixture in the fiber extrusion apparatus for final mixing into the polymeric blend of the present invention. As will be recognized, such reliance on the fiber extrusion apparatus requires careful design of extruder length, temperature profile and flight geometry to insure adequate mixing of the pellets before fiber extrusion.

In one embodiment the polymeric blends of the present invention may be made in a multiple gas phase reactor or a slurry loop reactor. For example, a multi zone circulating polymerization reactor can comprise a continuous loop of gas divided into two zones by a liquid monomer barrier held in place by tightly packed bed of polymer particles. A first monomer or monomer blend is introduced on one side of the bed and a second monomer or monomer blend is introduced on the other side of the bed. This approach can be used to "grow" polymer particles comprising an "onion-like" structure of the first and second polypropylene. Such technology is being commercialized by Basell Polyolefins of Wilmington, Del.

First Polypropylene

The polymeric blends of the present invention comprise a first polypropylene. The melt temperature of the first polypropylene $T_{M1}$ is less than the melt temperature of polymeric blend, $T_{Mb}$, and the $MFR_1$ of the first polypropylene is less than the $MFR_b$ of the polymeric blend. Particularly preferred are metallocene catalyzed polypropylenes having the requisite $T_{M1}$ and $MFR_1$.

In one optional preferred embodiment of the present invention the first polypropylene has an average melt temperature $T_{M1}$ of preferably from about 110° C. to about 135° C., more preferably from about 115° C. to about 135° C., even more preferably from about 120° C. to about 130° C.

The melt flow rate of the first polypropylene $MFR_1$ of the first polypropylene may be of any suitable value less than the melt flow rate of the polymeric blend provided the polymeric blend has an $MFR_b$ of from about 10 g/10 minutes to about 40 g/10 minutes. In one optional preferred embodiment of the present invention the of the first polypropylene is from about 5 g/10 minutes to about 25 g/10 minutes, preferably from about 5 g/10 minutes to about 20 g/10 minutes, more preferably from about 5 g/10 minutes to about 15 g/10 minutes.

Suitably, the first polypropylene can be prepared using any suitable polymerization process so as to have the requisite $T_{M1}$ and $MFR_1$. Suitable processes include Ziegler-Natta polymerization and metallocene polymerization. Preferably, the first polypropylene is a copolymer formed by the polymerization of propylene and either ethylene or a $C_4$ to $C_{20}$ α-olefin, wherein the polymerization is catalyzed by a metallocene catalyst. Such copolymerization disrupts the crystallinity of the polymer with a resulting reduction in the melting point thereof. Metallocene (i.e., a positively charged metal ion sandwiched between two negatively charged cyclopentadienyl derived anions) catalyzed polymerizations are desirable because such polymerizations provide greater precision with respect to the composition and molecular weight (melt flow rate) of the polymer chains, as well as a broader range of chemistries compared to other polymerization schemes. For example, unlike traditional Ziegler-Natta catalysts, well-defined grades with both narrow composition and molecular weight distributions may be produced. The effect of the narrower distribution can be seen by comparing the properties of blends G and H in the examples. As shown therein, blend G which uses a metallocene polymerized first polypropylene has an improved strength ratio compared to the Ziegler-Natta based blend. Such precision provides particular benefits to the first polypropylene by minimizing overlap in molecular weight distribution with the second polypropylene so as to insure the minimization of flow induced crystallization discussed above.

Alternatively, the melting point of the first polypropylene can be reduced by increasing the level of stereo or regio errors beyond the level found in typical commercial grades in the polymer chain. In general, the lower the self-similarity of the polymer chains, the lower the melting temperature. The self-similarity can be reduced either via the incorporation of randomly incorporated comonomer along the chain as discussed above, or, alternatively, by the introduction of stereo- or regio-errors along the chain. Stereo-error is characterized by a different spatial positioning of the pendant methyl group in the propylene monomer molecule with respect to the chain axis. Regio errors are produced when the propylene monomer is incorporated in a head-head or a tail-tail configuration. U.S. Pat. No. 6,555,643, describes specific metallocene catalysts that are capable of controlling both the distribution and the amount of stereo-errors incorporated into the polypropylene chain and, thus, tailoring the resultant amount of crystallinity and its melting temperature.

Suitable first polypropylenes include the metallocene polypropylene WINTEC WFX4T (formerly known as XK1159) available from Japan Polypropylene (Tokyo, Japan) and the random Ziegler-Natta copolymer Polypropylene 8650 from Total Petrochemicals USA, Inc. of Huston, Tex.

Second Polypropylene

The polymeric blends of the present invention comprise a second polypropylene. The melt temperature of the second polypropylene $T_{M2}$ is greater than the melt temperature of polymeric blend, $T_{Mpa}$, and the $MFR_2$ of the second polypropylene is greater than the $MFR_b$ of the polymeric blend.

In one optional preferred embodiment of the present invention the second polypropylene suitably has an average melt temperature $T_{M2}$ of from about 135° C. to about 165° C., preferably from about 140° C. to about 165° C., more preferably from about 145° C. to about 155° C.

The melt flow rate of the second polypropylene $MFR_2$ may be of any suitable value that is greater than the melt flow rate of the polymeric blend provided the polymeric blend has an $MFR_b$ between about 10 g/10 minutes and about 40 g/10 minutes. Suitably, $MFR_2$ is between about 25 g/10 minutes and about 50 g/10 minutes, preferably from about 25 g/10 minutes to about 45 g/10 minutes, more preferably from about 30 g/10 minutes to about 45 g/10 minutes.

In one optional embodiment of the present invention the second polypropylene is a resin with the appropriate melt temperature and melt flow rate. In one preferred embodiment of the present invention the second polypropylene is a, polypropylene wherein the polymerization is catalyzed by a metallocene catalyst.

A suitable second polypropylene is available from Exxon-Mobil Chemical Company (Houston, Tex.) as ACHIEVE 3825.

Polymeric Mixture

The polymeric blends of the present invention may be blended with an adjunct as described below in order to form a polymeric mixture that is also suitable for extrusion into fibers for formation of nonwoven materials having the desirable properties described above. Such polymeric mixtures may be prepared in any suitable fashion, such as, but not limited to, blending the desired components in the desired proportions using conventional blending, techniques and apparatus, for example, a Banbury-mixer (available from Farrel Corp., Ansonia, Conn.) or laboratory extruders, such as the Polylab Twin Screw Extruder (available from Thermo Electron (Karlsruhe), Karlsruhe, Germany) which are suitable for preparing small batches of material. Commercial scale pelletizing extruders may also be used for preparing larger blend quantities, and the like.

Adjunct

The polymeric blends and polymeric mixtures of the present invention may optionally include an adjunct. Suitable adjuncts include, but are not limited to, those which are typically used in fiber making, nonwoven processing, polymer composition and polymer formation. In the case of the polymeric blend, desirable adjuncts are those which form a solid solution, that is a homogeneous mixture, with the polymeric blend and other components of the polymeric mixture, such as but not limited to the first and second polypropylenes.

In one aspect, the adjunct is selected from the group of minor ingredients such as: nucleating agents, antiblock agents, antistatic agents, pro-heat stabilizers, lubricants, plasticizers, ultraviolet light stabilizer (A commercially available ultraviolet light stabilizer is TINUVIN 123 available from Ciba Specialty Chemicals North America of Tarrytown, N.Y.), light stabilizers, weathering stabilizers, weld strength improvers, slip agents (oleamide or erucamide), dyes, antioxidants (A commercially available antioxidant is IRGANOX 1010 available from Ciba Specialty Chemicals North America), flame retardants, pro-oxidant additives, natural oils, synthetic oils, anti-blocking agents (siliceous chalk), fillers and combinations thereof.

In the polymeric mixture, the adjunct comprises an amount effective to achieve the result the adjunct is present in the polymeric mixture to achieve. For example, a stabilizing amount for a UV stabilizer, a lubricating amount for a lubricating agent etc. Typically, the polymeric mixture comprises from about 0.1% to about 1.0% each of one or more of such minor ingredients.

In another aspect, the adjunct is selected from the group of polymers other than the first and second polypropylenes. This group of polymers comprises two subgroups: polymers soluble in the polymeric blend and polymers insoluble in the polymeric blend.

Polymers in the soluble subgroup include but are not limited to polypropylene homopolymers. Also suitable are polypropylenes with appreciable branching. When the soluble polymer includes an additional polypropylene, so as to create a tricomponent or higher component polymeric blend, the additional polypropylene must have melt temperature and melt flow rate values such that the melt temperature and melt flow rate of the additional polypropylene(s) fall within the rectangle defined by the melt temperature and melt flow rate index of the first and second polypropylenes. In this case, the first polypropylene is considered that polypropylene among the polypropylenes comprising the polymeric blend having the lowest melt temperature and melt flow rate and the second polypropylene is considered that polypropylene having the highest melt temperature and melt flow rate.

In one preferred embodiment the ternary blend comprises a low level of a RCP polypropylene resin prepared by Ziegler-Natta polymerization. Without being bound by theory it is believed that inclusion of a resin of this type provides a controlled amount of flow induced crystallization which reduces the "stickiness" of nascent fibers as they are extruded and drawn so as to reduce roping during the fiber extrusion process. As is known, roping is a defect in the nonwoven formation process caused by uncontrolled turbulence in the attenuating air stream as the extruded fibers are drawn which results in inter fiber adherence and an elongated thick "streak" in the nonwoven web. It is believed that roping is reduced because fibers comprising the Ziegler-Natta resin are less likely to adhere if they come together because of the reduced stickiness discussed above. In order to maintain the desirable properties resulting from the resin blends of the Ziegler-Natta resin should be used only at a relatively low level. Suitably, a ternary blend may comprise up to about 50% of a RCP Ziegler-Natta resin having melt flow rate and melt temperature properties comparable to the first polypropylene. Preferably, the ternary blend comprises about 25% or less of the Ziegler-Natta resin, more preferably about 10% or less of the Ziegler-Natta resin. If such a ternary blend is desired the blend should comprise at least about 5% of the Ziegler-Natta resin.

Polymers in the insoluble subgroup group are of interest because they form microinclusions in the polymeric blend that modify the properties thereof. For example, materials including but not limited to a low density or ultra low density ($\rho<0.9$ g/cc) polyethylene resin, a low melt temperature polypropylene ($T_M<110°$ C.), syndiotactic polypropylene or an EP elastomer-containing resin (e.g., ADFLEX thermoplastic polyolefin elastomer from Basell Polyolefins of Wilmington, Del.) provide increased resilience to the polymeric mixture with resulting improvements in fuzz resistance, bond strength and other properties related to absorption of mechanical energy. The dispersed rubbery phase is believed to act as a toughening agent and improve the toughness of bond sites, hence increasing the mechanical integrity of the web. In addition, it may also modify the characteristics of the extensional flow encountered by the polymer melt during fiber spinning and induce favorable changes in the resultant morphology of the fibers with regard to extensibility. Suitably, such second subgroup polymers may be incorporated into the polymeric mixture of the present invention at a level between 1% and about 25%. A preferred embodiment of the polymeric mixture of the present invention incorporates between about 1% and 15% of a polymer from the insoluble subgroup into the polymeric mixture for improved resiliency.

Polymers of the second subgroup can also include those polymers that form microinclusions without increasing the resiliency of the blend. Such polymers include but are not limited to polyethylene, ethylene/(alkyl)acrylate copolymers, polyesters and nylons. Without being bound by theory, it is believed that the microinclusions formed by this type of polymer interfere with the flow of segments of the polymeric chains of the first and second polypropylenes during extrusion and inhibit flow induced crystallization thereby. Said another way, the microinclusions are believed to inhibit streamline formation during extrusion (e.g., straightening, as a result of extrusion forces, of the typical random walk configuration of a melted polymer that is not under any sort of stress). As noted above, flow induced crystallization reduction is believed to provide lower yield stress and improved cold drawability.

Fibers

It has also been surprisingly found that fibers comprising a polymeric blend or polymeric mixture having an average melt temperature $T_{Mb}$ and a $MFR_b$ in the range described herein and nonwoven materials comprising the fibers, have superior performance with regard to extensibility, softness and abrasion resistance compared to fibers produced from other polypropylenes, such as blends, using resins having an average melt temperature and a melt flow rate outside the ranges specified herein for the first and second polypropylenes. Furthermore, the polymeric blends of the present invention will typically outperform other polypropylene resins and blends, of comparable MFR and melt temperature, especially with regard to the extent of and ease of fiber and web extensibility or cold-drawability.

Fibers comprising the polymeric blend or the polymeric mixture exhibit desirable high extensibility or cold-drawability at an unusually low stress, including drawing at high strain rate conditions (many commercial processes operate at strain rates of greater than 200 seconds$^{-1}$). Furthermore, nonwoven webs comprising such fibers exhibit a unique combination of high performance in extensibility, softness and abrasion resistance. Nonwoven webs having such a desirable combination of properties can be advantageously incorporated either alone or within a laminate in processes used for making a variety of low-cost, yet high performance disposable absorbent articles such as diapers, incontinence briefs, training pants, feminine hygiene garments, wipes, and the like, and are particularly well suited to provide key consumer benefits such as improved comfort and fit.

Specifically, the fibers of the present invention show a low yield stress at comparable ultimate tensile stress when compared to prior art fibers. Without being bound by theory, it is believed that this desirable combination of tensile properties results because the first polypropylene (low melt temperature, low melt flow rate) provides a high ultimate tensile stress (i.e., comparable to prior art fibers) because the long polymer chains that provide the low melt flow rate value thereof provide a "molecular backbone" to carry forces through the fiber while the second polypropylene provides the low yield stress because the lower molecular weight thereof resists premature flow induced crystallization, that, otherwise, produces higher yield stress, during spinning. This desirable combination of low yield stress and high ultimate tensile stress can most conveniently be expressed in the ratio of the properties. As is shown in Table 2, fibers spun at high spinning rates (i.e., a rate greater than about 2000 m/min) that comprise the polymeric blends and mixtures of the present invention have a lower yield stress to ultimate tensile stress ratio than fibers spun from prior art resins. Suitably, the ratio is less than 0.25, more preferably the ratio is less than 0.2.

As noted above, the lower yield stress of the fibers of the present invention will result easier cold drawing while the ultimate tensile stress (i.e., still comparable to fibers made using prior art resins) provides improved abrasion resistance and bond strength. Said another way, fibers comprising the polymeric blend and/or the polymeric mixture of the present invention have a greater ability to extend and permanently stretch, i.e. undergo cold-drawing between the crossover points within the web or fabric, prior to reaching the maximum characteristic strength of the bond site, which ultimately determines the mechanical integrity of the web or fabric. The result is thinner cold-drawn fibers in the stretched web that provides additional softness benefits for the web that otherwise has maintained its mechanical integrity (by preventing failure of fibers at the bond sites) and good abrasion resistance.

Suitably, fibers comprising polymeric blends according to the present invention have a yield stress of less than about 40 MPa, preferably less than about 35 MPa, more preferably less than about 30 MPa. Fibers comprising a polymeric blend according to the present invention also have an ultimate tensile strength of at least about 100 MPa, preferably greater than about 125 MPa, more preferably greater than about 140 MPa. In order to provide the desirable balance of good cold drawability and mechanical strength, the fibers of the present invention suitably have a ratio of yield stress to ultimate tensile stress of less than about 0.20, preferably less than about 0.175, more preferably less than bout 0.15.

The fibers may be of any suitable size, that is the fiber may have a diameter or equivalent diameter of from about 0.5 micron to about 200 microns. Fiber diameters or equivalent diameters between about 10 and about 40 microns are particularly preferred. Said another way, fibers incorporating the polymeric blends of the present invention are suitably between about 1 and about 10 denier, preferably between about 1 and about 8 denier, more preferably between about 1 and about 5 denier.

In one particularly preferred embodiment, the fibers comprise bicomponent fibers for improved consolidation. Bicomponent fibers are typically used as a means of better dissociating intrinsic fiber characteristics and bonding performance, the latter being typically dominated by the sheath in the case of bicomponent fibers. As is well known, a bicomponent fiber comprises first and second polymeric components that are coextruded so as to provide the fiber with certain desirable properties from each of the polymeric components (As will be recognized both the first and second polymeric components comprise thermoplastic polymers). For example a bicomponent fiber can comprise a first polymeric component having a lower softening temperature than the second polymeric component. Such structures reduce the risk of "burn through" during thermal consolidation.

The bicomponent fiber may be of any suitable configuration. Exemplary configurations include but are not limited to sheath-core, island-in-the sea, side-by-side, segmented pie and combinations thereof. In one optional embodiment of the present invention the bicomponent fibers have a sheath-core configuration.

Spunbond structures, staple fibers, hollow fibers and shaped fibers such as multi-lobal fibers can all be produced which comprise the polymeric blends and mixtures of the present invention. The fibers of the present invention may have different geometries that include round, elliptical, star shaped, rectangular, and other various eccentricities.

The bicomponent fibers have a size comparable to those comprising only the polymeric blend or mixture of the present invention. That is the fiber may have a diameter or equivalent diameter of from about 0.5 micron to about 200 microns. Fiber diameters or equivalent diameters between about 10 and about 40 microns are particularly preferred. Said another way, fibers incorporating the polymeric blends of the present invention are suitably between about 1 and about 10 denier, preferably between about 1 and about 5 denier, more preferably between about 1 and about 3 denier.

The amount of first polymeric component and second polymeric component present in the bicomponent fiber will depend upon many factors, such as but not limited to, polymers present, desired use of bicomponent fiber, desired properties of the bicomponent fiber, etc. In one optional embodiment the weight ratio of the first polymeric component to the second polymeric component is from about 1:20 to about 20:1.

In one optional embodiment of the present invention the second component of the bicomponent fiber exhibits a softening temperature greater than the softening temperature of the first polymeric component. Suitably, this difference in softening temperature is between about 1° C. and about 150° C.

Suitably, the second polymeric component is a thermoplastic polymer having an extrusion temperature that is compatible with the extrusion temperature of the first polymeric component. Preferred thermoplastic polymers include: polyolefins, particularly polyethylenes polypropylenes and polyolefin blends, polyamides, polyesters (including elastomeric polyesters) and polyamides. Particularly preferred second polymeric components are polyolefins such as polypropylene. An exemplary polypropylene second polymeric component is PROFAX PH835 as is available from Basell Polyolefins of Wilmington, Del. Also suitable as a second component are blends according to the present invention wherein the blend has an average melting temperature that is greater than the average melting temperature of the first component so as to provide the requisite difference in softening temperatures.

When the blends of the present invention are used as the second component, suitable first components include polyethylenes both homopolymers and blends. A suitable polyethylene homopolymer is ASPUN 6811A available from Dow Chemical of Midland, Mich. Particularly suitable blends are described in copending Provisional U.S. Pat. Application Ser. No. 60/539,299, filed in the name of Autran, et al. on Jan. 26, 2004, P&G Case 9498P.

Nonwoven Material

Typically, the fibers described above are consolidated into a nonwoven material. Consolidation can be achieved by methods that apply heat and/or pressure to the fibrous web, such as thermal spot (i.e., point) bonding. Thermal point bonding can be accomplished by passing the fibrous web through a pressure nip formed by two rolls, one of which is heated and contains a plurality of raised points on its surface, as is described in U.S. Pat. No. 3,855,046. Consolidation methods can also include, but are not limited to, ultrasonic bonding, through-air bonding, resin bonding, and hydroentanglement. Hydroentanglement typically involves treatment of the fibrous web with high pressure water jets to consolidate the web via mechanical fiber entanglement (friction) in the region desired to be consolidated, with the sites being formed in the area of fiber entanglement. The fibers can be hydroentangled as taught in U.S. Pat. Nos. 4,021,284 and 4,024,612.

Once consolidated, the web can be further processed (i.e., converted). For example, the web, either alone or in the form of a laminate with another material can be further processed to impart stretchability thereto. Methods for imparting stretchability to an extensible or otherwise substantially inelastic material by using corrugated interengaging rolls which incrementally stretch in the machine or cross-machine direction and permanently deform the material are disclosed in U.S. Pat. Nos. 4,116,892, 4,834,741, 5,143,679, 5,156,793, 5,167,897, 5,422,172, and 5,518,801. In some embodiments, the intermediate structure may be fed into the corrugated interengaging rolls at an angle with respect to the machine direction of this secondary operation. Alternatively, the secondary operation may employ a pair of interengaging grooved plates applied to the intermediate structure under pressure to achieve incremental stretching of the intermediate structure in localized portions. As noted above, the nonwoven webs of the present invention are particular suitable for these and similar processes because of their particularly desirable cold extensibility.

Nonwoven materials comprising the polymer blends of the present invention are particularly useful as a component of a disposable absorbent article (e.g., as a topsheet, a cuff material, a core wrap, and when laminated to a film or, otherwise, treated to be substantially impermeable to aqueous liquids as a backsheet). Although the nonwoven web of the present invention can find beneficial use as a component of a disposable absorbent article, such as but not limited to, disposable diapers, disposable incontinence briefs, disposable training pants, disposable pads or sheets for floor cleaning systems, such as the SWIFFER® cleaning system manufactured by The Procter & Gamble Company, catamenial products, disposable wipes, and the like; its use is not limited to disposable absorbent articles. The nonwoven web of the present invention can be used in any application requiring, or benefiting from, softness and extensibility.

The nonwoven web of the present invention may be in the form of a laminate. Laminates may be combined by any number of bonding methods known to those skilled in the art including, but not limited to, thermal bonding, adhesive bonding including, but not limited to spray adhesives, hot melt adhesives, latex based adhesives and the like, sonic and ultrasonic bonding, and extrusion laminating whereby a polymer is cast directly onto another nonwoven, and while still in a partially molten state, bonds to one side of the nonwoven, or by depositing melt blown fiber nonwoven directly onto a nonwoven. These and other suitable methods for making laminates are described in U.S. Pat. Nos. 6,013,151 and 5,932,497.

Test Methods

Rheo-Optical Characterization

This method is suitable for determination of the onset of flow induced crystallization in a polymeric melt. In summary, turbidity is measured as a function of time at various wall shear stresses ($\sigma_w$) using the apparatus and method described in U.S. Pat. No. 6,199,437 and discussed further in Kumaraswamy, G. et al., Review of Scientific Instruments, 70, 2097. Briefly, the following steps are used:
1) Determine a suitable sample evaluation temperature by:
   a) Determine the first order transition temperature (i.e., the crystalline melting point) using differential scanning calorimetry (DSC). A suitable instrument is available from TA Instruments of New Castle Del. as model TAQ1000.
   b) Using the DSC apparatus, heat the sample to 200° C. and hold it at that temperature for 2 minutes then cool the sample to a temperature 20° C. lower than the temperature determined in Step a.
   c) At the temperature of Step b, determine the time required for an exothermic peak using the DSC instrument in T4P mode. This is comparable to the time required for a 50% increase in turbidity in seconds ($t^0_{1/2T}$) at that temperature.
   d) Reduce the sample temperature 5° C. and repeat the isothermal determination of $t^0_{1/2}$
   e) Repeat step d until the last evaluation temperature is less than 110° C.

f) Plot a curve of $t^0_{1/2T}$ vs. temperature using the data collected from Steps c-e and determine the temperature where $t^0_{1/2}$ is equal to 10,000 seconds (~2.8 hrs). This temperature the quiescent $t^0_{1/2}$ (i.e., no shear-$\sigma_w=0$) for the sample and will be used in Step 3.
2) Using the apparatus described in Kumaraswamy, et al., heat the sample to a temperature of 200° C. and maintain the sample at that temperature for 2 minutes prior to any of the evaluations of step 3.
3) Measure $t_{1/2}$ using the apparatus and method described in the aforementioned paper by Kumaraswamy, et al. at the following conditions (Measurements should be conducted at the quiescent $t^0_{1/2}$ temperature determined in Step 1.):

| Approximate Nitrogen Pressure MPa | Approximate Inlet Pressure at Pressure Transducer MPa | Approximate $\sigma_w$ MPa |
|---|---|---|
| 0.31 | 31.0 | 0.09 |
| 0.35 | 34.5 | 0.10 |
| 0.41 | 41.4 | 0.12 |
| 0.48 | 48.3 | 0.15 |
| 0.52 | 51.7 | 0.16 |
| 0.55 | 55.2 | 0.17 |
| 0.69 | 69.0 | 0.21 |

Record the actual inlet pressure measured by the pressure transducer for each condition and use the following equation to relate the recorded pressure to actual $\sigma_w$:

$$\sigma_w = \Delta P * d/(2L)$$

where:
$\Delta P$=Pressure drop across shear instrument (equal to inlet pressure at transducer because atmospheric pressure is negligibly small at the experimental conditions used)
d=Depth of flow channel in shear instrument (A suitable value is 0.5 mm)
L=Length from pressure transducer to outlet of shear instrument (A suitable value is 8.3 cm.)
4) Plot the curve comparing $t_{1/2}$ and $\sigma_w$.
5) Determine the value of $t_{1/2}$ at a $\sigma_w$ of 0.11 MPa ($t^{0.11}_{1/2}$) and calculate the ratio of $t^{0.11}_{1/2}: t^0_{1/2}$.

Melt Temperature

Melt temperature can be suitably measured by the use of differential scanning calorimetry as described in ASTM standard method D1505. Report each melting peak temperature observed. In the case of blends, where the average melt temperature is reported, the average melt temperature is the linear weighted (by weight percent of the constituent resins or resin fractions in the blend) average of the melting peak temperatures for the constituent resins or fractions. For example, if TREF (see below) is used to characterize the composition of a blend, the melting peak temperature of each fraction should be determined and the fraction peak temperatures weighted according to the fractional composition determined from the TREF analysis to determine the melt temperature of the blend. Fractional melt temperatures can also be combined using compositional data to determine the melt temperature of blend components that are identified via other analytical methods (e.g., gel permeation chromatography or nuclear magnetic resonance).

Melt Flow Rate

Melt flow rate can be suitably measured by the use of ASTM standard method D1238. In the case of blends, where the average melt temperature is reported, the logarithm of the melt flow rate can be calculated by determining the linear weighted (by weight percent of the constituent resins or resin fractions in the blend) average of the logarithms for the constituent resins or fractions. For example, if TREF (see below) is used to characterize the composition of a blend, the melting melt flow rate of each fraction should be measured and the logarithm thereof determined. The fraction logarithms of melt flow rate are then weighted according to the fractional composition determined from the TREF analysis to determine the logarithm of the melt flow rate of the blend. The blend melt flow rate is determined via the antilogarithm.

Composition

Temperature Rising Elution Fractionation (TREF)

TREF analysis is suitable for separating a polymer sample into fractions representing the components thereof. In summary a sample is dissolved and the solution distributed over a carrier surface (e.g., a column packing material suitable for chromatography) the distributed solution is then slowly cooled to precipitate the polymer fractions in reverse order of solubility (i.e., the least soluble fractions precipitate first). After the sample has been cooled, a flowing solvent is passed over the precipitated polymer to redissolve the polymer. Discrete portions of the polymer solution formed thereby are collected providing fractions of the sample suitable for further analysis (e.g., gel permeation chromatography to determine the average molecular weight (detectors suitable for weight average, i.e., a light scattering detector or number average e.g., a capillary viscometer or both may be used) of the fraction or nuclear magnetic resonance to determine the degree of branching in the fraction). The temperature of the solvent is slowly increased increasing the solubilization power thereof so the fractions collected represent portions of the original sample of differing solubility. This solubility difference can be attributed to differences in properties such as molecular weight, degree of branching, etc.

Sample
1) Collect a 20 g sample of the polymeric material to be tested.
Method
Suitable TREF methods and apparatus are described in Wild, L., "Advances in Polymer Science", Vol. 98 (1990) Springer-Verlag Heidelberg, Germany, pp 1-47.

Mounting of Fiber Samples

For each sample tested, 10-12 fibers are randomly selected and separated from a bundle of extruded fibers. The fibers are then taped to a paper coupon, being sure to wrap tape and the end of the fiber over the backside the coupon. Care is taken not to stretch or deform the fiber in any way.

Fiber Configuration and Diameter

Fiber configuration can be suitably measured by microscopic examination of cross sections of extruded fibers where such cross sections are taken perpendicular to the long axis of the fiber.
Fiber diameter for the circular fibers described in the Examples can be suitably measured using a Zeiss Axioskope (Carl Zeiss, Milan, Italy) microscope equipped with a color video camera and a display monitor. With the fiber (mounted as described above) in focus under a 40× objective lens and a 1× eyepiece the diameter of the fiber is measured on the monitor in inches with a pair of calipers. The microscope is calibrated for this magnification, using a 1 mm scale divided into 100ths, manufactured by Graticules LTD of Tonbridge, UK.

Denier

Denier can be suitably measured by the use of ASTM standard method D1577.

Tensile Properties

Low Speed Tensile Properties (Fibers)

Low speed tensile properties are measured according to ASTM standard D3822. An MTS Synergie™ 400 tensile testing machine (MTS Systems Corporation, Eden Prairie, Minn.) equipped with a 10 Newton load cell and pneumatic grips may be used. Tests are conducted at a crosshead speed of 200% per minute on single fiber samples with a 2.54 cm gage length. Coupon mounted fibers are loaded into the tester grips. The paper is then cut away so as not to interfere with the test result. Samples are pulled to break. Reports include calculations for peak load, ultimate tensile stress, elongation to break (break elongation), Young's modulus, and energy per volume at break. The stress at 30% strain is considered the yield stress.

Low Speed Tensile Properties (Nonwoven Materials)

Low speed tensile properties are measured according to EDANA (European Disposables and Nonwovens Association) Standard Method 20.2-89. An MTS Synergie™ 400 tensile testing machine (MTS Systems Corporation, Eden Prairie, Minn.) equipped with a 100 Newton load cell and pneumatic grips may be used. The following conditions are used:

Crosshead Speed: 127 mm/min
Gage Length: 127 mm
Sample Width: 25.4 mm

Activation Tensile Properties

Activation tensile properties may be determined using the apparatus and method described in copending U.S. patent application Ser. No. 10/377,070, entitled "Ring Rolling Simulation Press", filed in the names of Anderson, et al. on Feb. 28, 2003. The following setup conditions are used. which correspond to a maximum strain rate of 500 sec$^{-1}$:

Web Temperature: 25±3° C.
Tooth Pitch: 1.52 mm
Engagement Distance: 3.65 mm
Entering Roll Diameter: 152.4 mm
Exiting Roll Diameter: 152.4 mm
Web Speed: 1.21 msec Fuzz Level Test This method is used as a quantitative prediction of the abrasion resistance of nonwoven or laminate materials and is accomplished by abrading an 11.0 cm×4.0 cm piece of test material with 320 grit sandpaper using a Sutherland Ink Rub Tester with a 2 pound weight. Loose microfibers are collected on an adhesive tape which is weighed to determine loose microfibers collected per unit area. Details of the method are given in published US Pat. Application 2002/0119720 A1. As practiced to evaluate materials of the present invention, the release liner delineated in the fuzz level method of the '720 application is available from American Coated Products of Zionsville, Ind. as 40# Release Paper.

EXAMPLES

The following examples illustrate the practice of the present invention but are not intended to be limiting thereof. Additional embodiments and modifications within the scope of the claimed invention will be apparent to one of ordinary skill in the art. Accordingly, the scope of the present invention shall be considered in the terms of the following claims, and is understood not to be limited to the methods described in the specification. The overall objective is to demonstrate the effect of broad composition and melt flow rate variation on the overall balance of properties of fibers and spunbond webs made with tailored polypropylene/propylene random copolymer (PP/RCP) blends, and in particular relative to their elongational properties.

Example 1

This example describes the preparation of miscible (or at least highly compatible) PP/RCP blends with broad composition and broad molecular weight distributions comprising one polypropylene homopolymer and a propylene/ethylene random copolymer of different crystallinity (as measured by the average melt temperature) and melt flow rate The blends were prepared by dry-blending followed by compounding of a polypropylene homopolymer resin with a RCP resin in a polymer extruder to achieve optimal melt miscibility of the blend components with one another. While no analysis was made, it is believed that these resins also contained effective amounts of minor ingredients (e.g., antioxidants). The extruder used for the following examples is a Werner & Pfleiderer (30 mm diameter 40:1 length to diameter ratio) co-rotating twin-screw extruder set at 300 RPM with the five heat zones set at 180, 195, 205, 200 and 213° C. respectively, resulting in an average melt temperature of 229° C. All materials were run at a mass throughput of 20 pounds per hour (9 kg/hour). Pellets of the blended resins were obtained by extruding the strand through a water bath to cool and crystallize the material, followed by passing through a pelletizer to cut the strand into pellets.

Examples of bicomponent blends and their components that have been prepared via the above methods are listed in Table 1 below. The components were commercial narrowly-defined Ziegler-Natta or metallocene-catalyzed polypropylene homopolymers or RCP resins supplied by the ExxonMobil Company, the Japan Polypropylene Company of Tokyo, Japan, Ato-Fina Chemicals of Houston Tex. and the Solvay Polyolefins Europe of Brussels, Belgium. They are described in Table 1 by their melting point (which is a measure of average composition) as well as their melt flow rate (which is a measure of the average molecular weight). The bicomponent blends are described also by their average melting point (calculated as a weighted average of the melting points of the constituent materials) and their average melt flow rate as determined by the standard rule of mixtures applied for miscible polymers. The resultant blends have broad melt flow rate and composition distributions. Also included in Table 1 are the molecular characteristics of several other PP-based grades.

TABLE 1

| Composition | Resin/blend Designation | Average Melt Temp (deg C.) | Average Melt Flow Rate (g/10 minutes) |
|---|---|---|---|
| A[1] | XK1167 | 125 | 40 |
| B[2] | PP1154 | 158 | 13 |
| C[3] | EOD 00-07 | 151 | 8 |
| D[4] | ACHIEVE 3825 | 151 | 32 |
| E[5] | KS349 | 115 | 7 |
| F[1] | WINTEC WFX4T | 125 | 7.3 |
| G | Blend: 30%(F)/70%(D)[8] | 143.2 | 20.3 |
| H | Blend: 60%(D)/40%(E)[8] | 136.6 | 17.7 |

TABLE 1-continued

| Composition | Resin/blend Designation | Average Melt Temp (deg C.) | Average Melt Flow Rate (g/10 minutes) |
|---|---|---|---|
| I | Blend: 40%(A)/60%(B)[9] | 144.8 | 20.4 |
| J | Blend 50%(A)/50%(C)[9] | 138 | 17.9 |
| K[4] | ACHIEVE 3854 | 151 | 24 |
| L[6] | PDC1267 | 163 | 18 |
| M[7] | Pro-fax PH835 | 163 | 34 |
| T | Blend: 35%(F)/65%(D)[8] | 141.9 | 18.8 |

Figure 1:
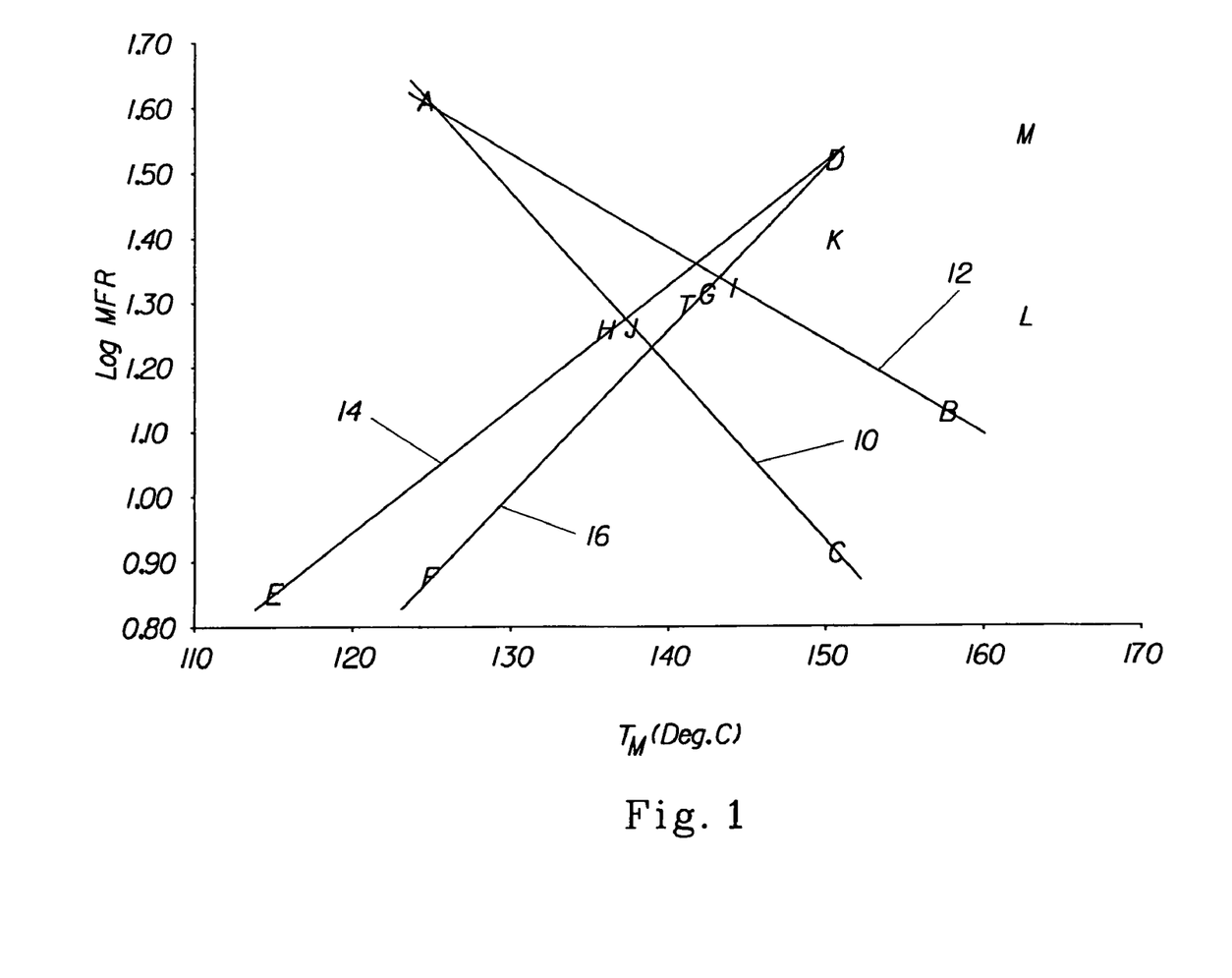
FIG. 1 is a graph showing the relationship between the polymeric blends and mixtures of the present invention and prior art polymeric blends along with the properties of the resins used to produce the blends.

[1]Japan Polypropylene (Tokyo, Japan) metallocene propylene/ethylene random copolymer
[2]Exxon (ExxonMobil Chemical Company of Houston, TX) Control Rheology-polypropylene homopolymer
[3]AtoFina Chemicals (Houston, TX) metallocene polypropylene homopolymer
[4]Exxon metallocene polypropylene homopolymer
[5]Solvay Polyolefins Europe (Brussels, Belgium) Ziegler-Natta - propylene/ethylene random copolymer
[6]Basell Polyolefins (Wilmington, DE) Ziegler-Natta propylene homopolymer
[7]Basell Polyolefins (Wilmington, DE) Ziegler-Natta controlled rheology propylene homopolymer
[8]Type 2 Blend
[9]Type 1 Blend The melting point ($T_M$) and melt flow rate (as a logarithm, i.e., log MFR) of each of these materials are plotted in FIG. 1. The blends are plotted on lines connecting the properties of the constituent resins. As can be seen these lines have two markedly different slopes. Lines 10 and 12 have a negative slope and represent blends which are called a Type 1 blend (e.g., blends I and J) herein. Type 2 blends are represented as lying along lines 14 and 16, each of which has a positive slope in FIG. 1 (e.g., blends G and H). Certain Type 2 blends (e.g., blend G) represent a blend according to the present invention. As can also be seen in FIG. 1 blends having similar $T_M$ and log MFR can be produced as either a Type 1 blend or a Type 2 blend (compare blends H and J and blends G and I). As will be seen in subsequent examples, Type 1 blends and Type 2 blends (i.e., blends of the present invention) have very different properties.

Example 2

Fiber Spinning

Neat or compounded materials were melt spun into fibers using a two extruder system, where each extruder is a horizontal single-screw extruder. The extrudate rate from each extruder to the spinpack is controlled by a metering melt pump that feeds a 4-hole spin pack (Hills Incorporated, W. Melbourne, Fla.). The extruders were set up to deliver the resin or resin blend to the melt pump at a temperature of about 230° C. In all examples the spinpack is fitted with a spinneret for a round hole, and distribution plates for a sheath-core cross-section. For the monocomponent fibers of this example, the same resin is used in both extruders at a sheath-to-core ratio of approximately 50:50. The extruder/melt pump/spinpack system is mounted on an adjustable height platform. In these examples, the mass throughput was maintained constant at approximately 0.8 grams/hole/minute and the spin line length was maintained constant at a distance of approximately 1.78 meters. The molten filaments exit the spinneret into a quench cabinet that is located directly below the spinpack and are drawn down with a height adjustable air drag device that uses compressed air at high pressures to produce a stream of air that surrounds and draws the filaments. A series of fiber diameters is collected by varying the air gun inlet pressure and the air gun type.

Fibers were spun at various drawdown ratios and collected for tensile testing. The rate of fiber spinning is defined by the amount of drawdown imparted onto the fiber in the spinning process. It is directly related to the final diameter of the spun fiber, for a given known polymer throughput. The following examples, summarized in Table 2, provide the results of testing fibers with some of the polymer compositions listed in Table 1.

TABLE 2

| Resin/Blend | G | H | I | J | K | L | M |
|---|---|---|---|---|---|---|---|
| Avg. Yield Stress[1] (MPa) | 22 | 64 | 55 | 83 | 48 | 64 | 40 |
| Ultimate Tensile Stress[1] (MPa) | 142 | 236 | 161 | 254 | 215 | 144 | 183 |
| Yield/Ultimate Tensile Ratio[1] | 0.155 | 0.271 | 0.342 | 0.327 | 0.223 | 0.444 | 0.219 |
| Avg. Yield Stress[2] (MPa) | 36 | 68 | 67 | 75 | 95 | 84 | 76 |
| Ultimate Tensile Stress[2] (MPa) | 243 | 213 | 182 | 242 | 290 | 159 | 251 |
| Yield/Ultimate Tensile Ratio[2] | 0.148 | 0.319 | 0.368 | .310 | .328 | 0.528 | 0.303 |

[1]Extruded at ~1200 m/min
[2]Extruded at ~1700 m/min

Example 3

Inclusion of Immiscible Components

This example describes preparation and evaluation of samples that incorporate a fraction of an immiscible component (second subgroup polymers).

Dispersions of such second subgroup polymers in various polypropylene resins or resin blends were prepared as described in Example 1 above. Table 3 shows the composition of the dispersions of this example.

TABLE 3

| Composition | Resin/blend Designation |
|---|---|
| O | Blend: 75% M/20% AdFlex[1]/5% HDPE[2] |
| P | Blend: 75% K/20% AdFlex[1]/5% HDPE[2] |
| Q | Blend: 75% I/20% AdFlex[1]/5% HDPE[2] |
| R | Blend: 75% G/20% AdFlex[1]/5% HDPE[2] |

[1]ADFLEX Z104S from Basell Polyolefins of Wilmington, DE.
[2]05862N HDPE from Dow Chemical Company of Midland, MI.

These dispersions were then spun into fibers at an extrusion rate of about 1700 meters/minute using the apparatus described in Example 2 above. Table 4 lists various mechanical properties for the fibers.

TABLE 4

| Composition | O | P | Q | R |
|---|---|---|---|---|
| Draw/Yield Str. ~30% | 46 | 68 | 56 | 32 |
| Tensile Strength | 155 | 160 | 163 | 140 |
| Draw Str./Tens. Str. | 0.297 | 0.425 | 0.344 | 0.229 |

Example 4

Flow Induced Crystallization Kinetics

This example compares the flow induced crystallization kinetics of Type 1 and Type 2 blends. In this example melts of a Type 1 blend (Blend G) and a Type 2 blend (Blend I) were evaluated for turbidity during flow through a shear instrument at various wall shear stresses ($\sigma_w$) using the method described as Rheo-Optical Characterization in the Test Methods section below. As will be recognized, crystallization from a melt will cause an increase in turbidity from the solid phase that is produced therein which relates to the amount of crystallization and which can be measured. Differential Scanning Calorimetry was used to determine a melt temperature for each of the Type 1 and the Type 2 blends that gave comparable quiescent ($\sigma_w=0$) crystallization rates. As a result, the rheo-optical data were gathered at a temperature of 145° C. for the Type 1 blend and at 142° C. for the Type 2 blend. The results are shown in FIG. 2. which compares $t_{1/2}$ (time required for a 50% increase in turbidity in seconds) with the wall shear stress ($\sigma_w$) in mega Pascals (MPa). As can be seen in FIG. 2, the curve for the Type 1 blend 201 shows: 1) a value for $t^0_{1/2}$ that is substantially equal to the value for the Type 2 blend and 2) a rapid increase in turbidity (rapid decrease in $t_{1/2}$) at a value of $\sigma_w$ that is slightly greater than 0.11 MPa. On the other hand, the curve for the Type 2 blend shows a monotonically decreasing change in $t_{1/2}$ over the range of $\sigma_w$ that was evaluated.

Example 5

Nonwoven Production

The following example demonstrates extrusion and formation of nonwoven materials on a spunbond nonwoven pilot line. Nonwoven materials having the compositions and properties described in Table 5 were prepared at a pilot scale on a 1 meter wide spunbond pilot line with a slot jet attenuation system. The webs were produced at a mass throughput of about 0.3 grams per hole per minute and thermally consolidated with one of two different bonding patterns. Pattern S has diamond shaped bond sites with a total bond area of 14% and a bond density of 32 bonds/cm². Pattern A has square bond sites with a total bond area of 15% and a bond density of 26 bonds/cm².

TABLE 5

| PP Resin/Blend | Basis Weight (g/m²) | Fiber Diameter (micron) | Bonding T. (° C.) |
|---|---|---|---|
| Bond Pattern S | | | |
| M | 27 | 21 | 123 |
| T | 25 | 21 | 113 |
| Bond Pattern A | | | |
| M | 22 | 19 | 124 |
| T | 21 | 19 | 118 |
| T | 21 | 19 | 113 |

Table 6 lists the mechanical properties of these webs.

TABLE 6

| PP Resin/Blend | CD Tensile Strength (N/2.54 cm) | Activation Strain -CD Percent[1] (%) | Fuzz Level[1] (mg/cm²) | CD Activation Load[1] (N/cm) |
|---|---|---|---|---|
| Bond Pattern S | | | | |
| M | 10.2 | 100 | 0.32 | 12.0 |
| T | 9.0 | 146 | 0.35 | 13.2 |
| Bond Pattern A | | | | |
| M | 7.5 | 102 | 0.28 | 12.0 |
| T[1] | 6.3 | 111 | 0.17 | 6.8 |
| T[2] | 7.6 | 121 | 0.25 | 8.9 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A polypropylene material comprising a polymeric blend, the polymeric blend comprising:
    (a) a first linear low density metallocene polypropylene having a Melt Flow Rate from about 5 g/10 minutes to about 25 g/10 minutes; and
    (b) a second linear low density polypropylene;
    wherein the polypropylene material has a first turbidity half time measured under quiescent conditions, and a second turbidity half time measured at a wall shear stress of about 0.11 MPa, wherein the ratio of the second turbidity half time to the first turbidity half time is greater than about 0.33.

2. A polypropylene material according to claim 1, wherein the ratio is greater than about 0.5.

3. A polypropylene material according to claim 2, wherein the ratio is greater than about 0.75.

4. A polypropylene material according to claim 1, wherein for the polymeric blend, the first metallocene polypropylene is a random copolymer of propylene and ethylene.

5. A polypropylene material according to claim 1, wherein for the polymeric blend, the first metallocene polypropylene is a copolymer of propylene and a co-monomer selected from the group consisting of ethylene and $C_4$ to $C_{20}$ α-olefins.

6. A polypropylene material according to claim 5, wherein for the polymeric blend, the second polypropylene is a copolymer formed by the polymerization of propylene and $C_4$ to $C_{20}$ α-olefin.

7. A polypropylene material according to claim 1, wherein the second turbidity half time is greater than about 1000 sec.

8. A polypropylene material according to claim 7, wherein the second turbidity half time is greater than about 2000 sec.

9. A polypropylene material according to claim 8, wherein the second turbidity half time is greater than about 3000 sec.

10. A polypropylene material according to claim 3, wherein the ratio is greater than about 0.9.

11. A polypropylene material according to claim 1, wherein the second linear low density polypropylene has a Melt Flow Rate from about 25 g/10 minutes to about 50 g/10 minutes.

* * * * *

UNITED STATES PATENT AND TRADEMARK OFFICE
CERTIFICATE OF CORRECTION

PATENT NO.        : 7,960,478 B2
APPLICATION NO.   : 12/842107
DATED             : June 14, 2011
INVENTOR(S)       : Autran et al.

It is certified that error appears in the above-identified patent and that said Letters Patent is hereby corrected as shown below:

<u>Column 15</u>

Line 41, delete "clauclate" and insert --calculate--.

Signed and Sealed this
Tenth Day of April, 2012

David J. Kappos
*Director of the United States Patent and Trademark Office*